United States Patent
Ljungqvist et al.

(10) Patent No.: US 7,603,354 B2
(45) Date of Patent: Oct. 13, 2009

(54) METHOD FOR ENHANCING THE OPERATION OF A DATABASE

(75) Inventors: Mats Ljungqvist, Huddinge (SE); Lars-Ivar Sellberg, Danderyd (SE)

(73) Assignee: Cinnober Financial Technology AB, Stockholm (SE)

( * ) Notice: Subject to any disclaimer, the term of this patent is extended or adjusted under 35 U.S.C. 154(b) by 433 days.

(21) Appl. No.: 11/350,492

(22) Filed: Feb. 9, 2006

(65) Prior Publication Data

US 2007/0260644 A1    Nov. 8, 2007

(51) Int. Cl.
    G06F 17/30    (2006.01)
(52) U.S. Cl. ......................................... 707/8
(58) Field of Classification Search ............... 707/8, 707/9, 203, 205; 709/228, 229; 710/200; 711/141; 715/229; 718/106; 719/314, 318
See application file for complete search history.

(56) References Cited

U.S. PATENT DOCUMENTS

| | | | | |
|---|---|---|---|---|
| 5,884,328 | A * | 3/1999 | Mosher, Jr. | 707/202 |
| 6,434,568 | B1 * | 8/2002 | Bowman-Amuah | 707/103 R |
| 7,203,863 | B2 * | 4/2007 | Pavlik et al. | 714/15 |
| 7,228,455 | B2 * | 6/2007 | Pavlik et al. | 714/15 |
| 2003/0126139 | A1 * | 7/2003 | Lee et al. | 707/100 |
| 2006/0059253 | A1 * | 3/2006 | Goodman et al. | 709/223 |
| 2006/0235889 | A1 * | 10/2006 | Rousseau et al. | 707/104.1 |

FOREIGN PATENT DOCUMENTS

WO    03001412 A2    1/2003

OTHER PUBLICATIONS

European Search Report (Munich), Dated Aug. 8, 2008 (2 pages).
Chamberlin, D., "A Complete Guide to DB2 Universal Database", Complete Guide to DB2 Universal Database, Jan. 1, 1998, pp. 9-13, XP002239913.
Gray, J. et al., "Transaction Processing: Concepts and Techniques, Passage" Jan. 1, 1993 Transaction Processing: Concepts and Techniques, pp. 249-267, 301, XP002323530.
Haerder T. et al., "DatenbankSysteme Konzepte and Techniken der Implementierung", Mar. 31, 1999, Datenbanksysteme: Konzepte Und Techniken Der Implementierung, pp. 455-497, XP002219228.
Jim Gray Reuter A, "Transaction Processing: Concepts and Techniques" Jan. 1, 1993, Transaction Processing: Concepts and Techniques, pp. 493-525, XP002947548.

* cited by examiner

*Primary Examiner*—Diane Mizrahi
(74) *Attorney, Agent, or Firm*—Coats & Bennett, P.L.L.C.

(57) ABSTRACT

A computer system includes a server that is connected to a database. The server receives incoming messages from one or more of client devices and stores the incoming messages in a flat file. The incoming messages include instructions for updating the database. The server updates the database by performing update operations according to the received instructions, and compares a commit interval duration to a predetermined threshold. Based on results of the comparison, the server selectively issues a database commit command to make all database updates performed since a last database commit operation a permanent part of the database.

13 Claims, 4 Drawing Sheets

METHOD FOR ENHANCING THE OPERATION OF A DATABASE

BACKGROUND OF THE INVENTION

The present invention relates to electronic trading systems for trading stocks, bonds, futures, options and other financial instruments as well as betting and e-gaming, and in particular to methods, computer readable mediums and computer program products for such systems.

During the last decade, almost all the world's exchanges and marketplaces have introduced electronic trading systems. These systems either replace the traditional trading floors or are used as complements to them. Today a large number of exchanges throughout the world utilize electronic trading to trade stocks, bonds, futures, options and other financial instruments. These electronic exchanges generally include three basic components, namely server computers (host), communication servers, and the exchanges participants computers (client). The host constitutes, so to speak, the heart of the electronic trading system. The hosts operations includes, for example, order-matching, maintaining order books and positions or price information. Participants, e.g., traders, are capable of communicating with the host by means of high speed data lines, high speed communications servers and the Internet. Thus, the traders can participate in the market by means of the clients communicating with the host.

In order to secure system availability, the exchange's system often uses two servers placed in two geographically different spots interconnected via a network. One of the servers is considered being the primary server and the other consequently as the secondary. The system will be operational with only one server acting as primary, but will then, of course, not be redundant. The primary server will accept incoming messages, store them to disk (i.e., a disk unit) in a log file and replicate the message to the secondary node or server. The two servers then perform the same business logic procedure based on the incoming message. This results in the two servers being synchronized and having the same application state, i.e., each transaction has the same state with respect to, for example, price or volume of a stock. If the primary server fails for some reason, the secondary server is accordingly able to take over and take the role as primary node and accept incoming messages. On the other hand, if the secondary server fails for some reason, the primary server just continuous to operate.

In order to be able to access data in such a system, such as user data (e.g., data regarding e-mail address and telephone number of a specific user), or instrument data (e.g., data regarding traded instruments), in a structured and efficient way, such data is stored in SQL databases connected to the servers. This data is used by the business logic of the servers during the processing of incoming messages i.e., transactions. When a server receives an updating message, i.e., a message containing a number of updating instructions (e.g., add a new user or add a new instrument), the database is updated according to the instructions in the updating message. The updating operations, i.e., the new information, is not permanently stored in the database until they are committed or confirmed, i.e., a command making all data modifications performed since the start of the updating operation a permanent part of the database. If the database or a server should fail for some reason before an operation, i.e., an updating, has been committed, the updated information will thus be lost since it not has become a permanent part of the database yet. Consequently, a large number of committing operations will have to performed in order to assure reliable in service, or in other words, to assure that no updating data is lost in case of failure of the database or the server. Each committing operation is time-consuming and puts a load on the databases and the servers. If a large number of updating messages is received and/or updating messages containing a large number of updating operations, the required committing operations may introduce significant time delays and/or significant load on the database and thus the performance of the system may be periodically degraded.

Thus, there is need of an improved method for a trading system.

SUMMARY OF THE INVENTION

The present invention provides an improved method for a trading system that enhance the performance of the system.

The present invention provides an improved method for a trading system that is capable of updating a database in a more efficient way in terms of system load.

Furthermore, the present invention provides an improved method for a trading system that is capable of updating a database in a more efficient way in terms of time consumption.

This may be achieved according to the present invention by providing a method, a computer program, and a computer readable medium having the features defined in the independent claims. Embodiments of the present invention are defined in the dependent claims.

According to a first aspect of the present invention, there is provided a method for a computer system communicating with a plurality of clients, which system includes at least a server, wherein the server receives incoming messages of the system, the server being connected to a database for storing information according to instructions of the incoming messages, the method comprising the steps of: receiving updating instructions via incoming messages; storing the incoming messages in a file having a horizontal file structure; updating the database by performing updating operations according to the instructions of the messages; and performing a committing operation of all updating operations performed since the last committing operation at predetermined intervals in order to make all data modifications performed since the start of the last committing operation a permanent part of the database.

According to second aspect of the present invention, there is provided a computer program product which, if executed on a computer, performs steps in accordance with the method according to the first aspect.

According to a third aspect of the present invention, there is provided a computer readable medium comprising instructions for bringing a computer to perform the method according to the first aspect.

The invention is based on the idea of storing incoming updating messages in a horizontal file structure, updating the database with the operations instructed by the received messages but only perform a committing operation in the database at predetermined intervals. Thus, the database is updated with a number of operations, for example add a user, as instructed by the received updating messages stored in the horizontal structure. The result of these operations is visible to the business logic even though the operation are not committed, i.e., a command making all data modifications performed since the start of the updating operation a permanent part of the database. That is, the business can access updated information of the database which not yet have been committed. Due to the fact that the operations performed in the database is committed only at regular intervals the performance of the system can be enhanced. Accordingly, it is possible to access data, i.e., updating of the information of the database, in a structured way the same time as the number of I/O-operations (writing operations) are significantly reduced. Furthermore, if the database or server should fail for some reason, the information that not yet has been committed in the database, i.e., permanently stored in the database, can be recovered from messages stored in the horizontal file. Thereby, the performance of the system can be improved, the message handling can be significantly improved and the risks for latencies can be decreased.

Thus, the present invention is based on the insight that the business logic of a server can access the updated information of the database without the commitment being made. That is, if the business logic looks for, for example, a new user that is stored in the database but the storage of the message containing the updating information regarding this new user has not been committed, the business logic is able to find the new user. In other words, for the business logic it makes no difference whether the message has been committed or not.

As realized by the person skilled in the art, the methods of the present invention, as well as preferred embodiments thereof, are suitable to realize as a computer program or a computer readable medium.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF DRAWINGS

In the following description of an embodiment of the invention, reference will be made to the accompanying drawings of which.

DETAILED DESCRIPTION OF THE INVENTION

In the following there will be discussed embodiments of the method for efficient handling of incoming transaction in a computer system. It should be noted that, even if the embodiments discussed hereinafter are shown as being implemented within the contents of an electronic trading system, the present invention can be implemented in practically all transaction burdened computer systems, as the skilled man within the art also easily realizes.

Figure 1:
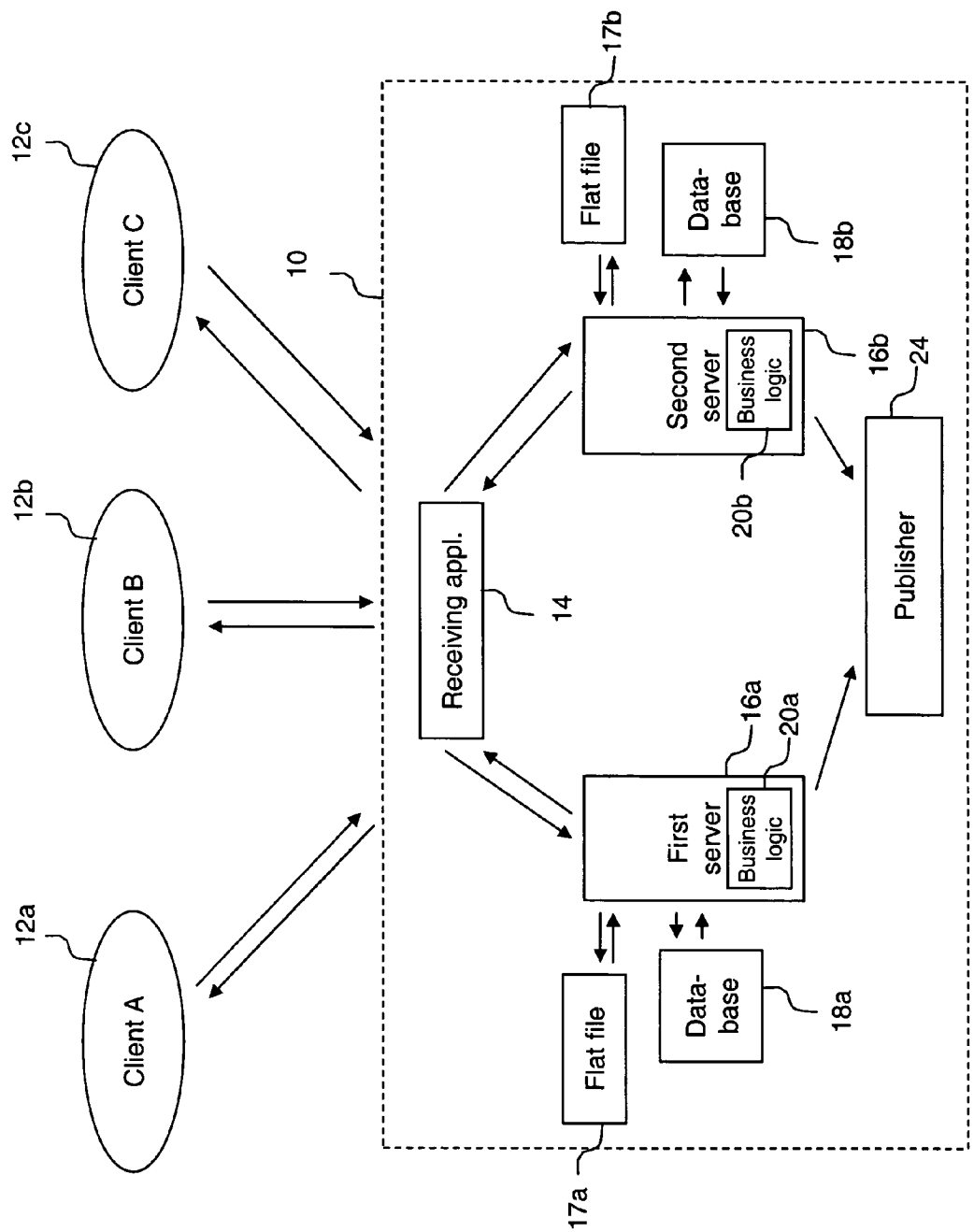
FIG. 1 is a general view of an electronic trading system in which the present invention can be implemented.

With reference first to FIG. 1, an electronic trading system in which the present invention can be implemented will be discussed. A number of clients, here indicated by client A 12a, client B 12b, and client C 12c, communicates with the trading or exchange system 10. Thus, traders can participate in the market by means of the clients 12a-12c communicating with the exchange system 10, i.e., the host. The clients 12a-12c may link to the system 10 via high speed data lines, high speed communication servers, or the Internet. High speed data lines establish direct connection between a client and the system. Connection can also be established between the client and the system by configuring high speed networks or communication servers at strategic access points in locations where traders physically are located. Internet is a third communication means enabling traders, using, for example, the clients 12a-12c, to communicate using, for example, high speed data lines connected to the Internet. Hence, trades are allowed to be located anywhere they can establish a connection to the Internet.

The system 10 comprises a receiving gateway 14 arranged to receive incoming messages from the clients 12a-12c and distribute them to a server 16a acting as the primary node. In order to secure system availability, the exchange's system often uses two servers placed in two geographically different spots interconnected via a network. One of the servers is considered being the primary server and the other consequently as the secondary. The system will be operational with only one server acting as primary, but will then, of course, not be redundant. A storage means 18a, e.g., a SQL database, is connected to the primary server 16a and contains, inter alia, information regarding, for example, users and traded instruments. This database 18a may be of course be physically separated from the server 16a. The secondary server 16b is hence connected to the primary server 16a, and incoming messages is distributed to the secondary server 16b via the primary server 16a. A storage means 18b, e.g., a SQL database, is connected to the secondary server 16b and contains, inter alia, information regarding, for example, users and traded instruments. This database 18b may be of course be physically separated from the server 16b. The two servers 16a, 16b perform the same business logic procedure based on incoming transaction messages in the business logic units 20a and 20b, respectively. This results in the two servers being synchronized and having the same application state. If the primary server fails for some reason, the secondary server is accordingly able to take over and take the role as primary node and accept incoming messages. On the other hand, if the secondary server fails for some reason, the primary server just continuous to operate. The business logic 20a and 20b utilizes information stored in the databases 18a and 18b, respectively, when processing transactions, for example, in order to check whether a specific user is permitted to perform a certain transaction.

According to the conventional technique, the primary server 16a receives incoming updating messages containing a number of updating instructions for the database 18a, e.g., add a new user or change an address of an user, via the receiving application 14 from a client 12a-c. These updating messages are stored in a memory 17a persistently, for example, a transaction log file in a non-volatile memory, such as a magnetically or optically readable disk. Received updating messages may also be distributed to the secondary server 16b for updating of the database 18b connected to the secondary server 16b. Each updating message contains, as mentioned above, a number of database updating instructions, each instruction causing an updating operating in the database 18a. The updating operations is not permanently stored in the database until they are committed or confirmed, i.e., a command making all data modifications performed since the start of the updating operation a permanent part of the database. If the database 18a or the server 16a should fail for some reason before an operation, i.e., an updating, has been committed, the updated information will be lost since it not has become a permanent part of the database yet. Thus, a large number of committing operations will have to performed in order to assure that no data is lost.

As mentioned above, the first server 16a has also access to a file having horizontal file structure, such as a flat file, in the memory 17a and the second server 16b has also access to a memory 17b, for example, a transaction log file in a non-volatile memory, such as a magnetically or optically readable disk, including a file having horizontal file structure, such as a flat file. The first and second server 16a and 16b, respectively, are capable of storing messages in the flat file in the memory 17a and 17b, respectively. The messages are stored in sequence number order, i.e., in the order they are received. Thus, the storage is fast and no confirmation that the message has been stored is received.

Figure 2:
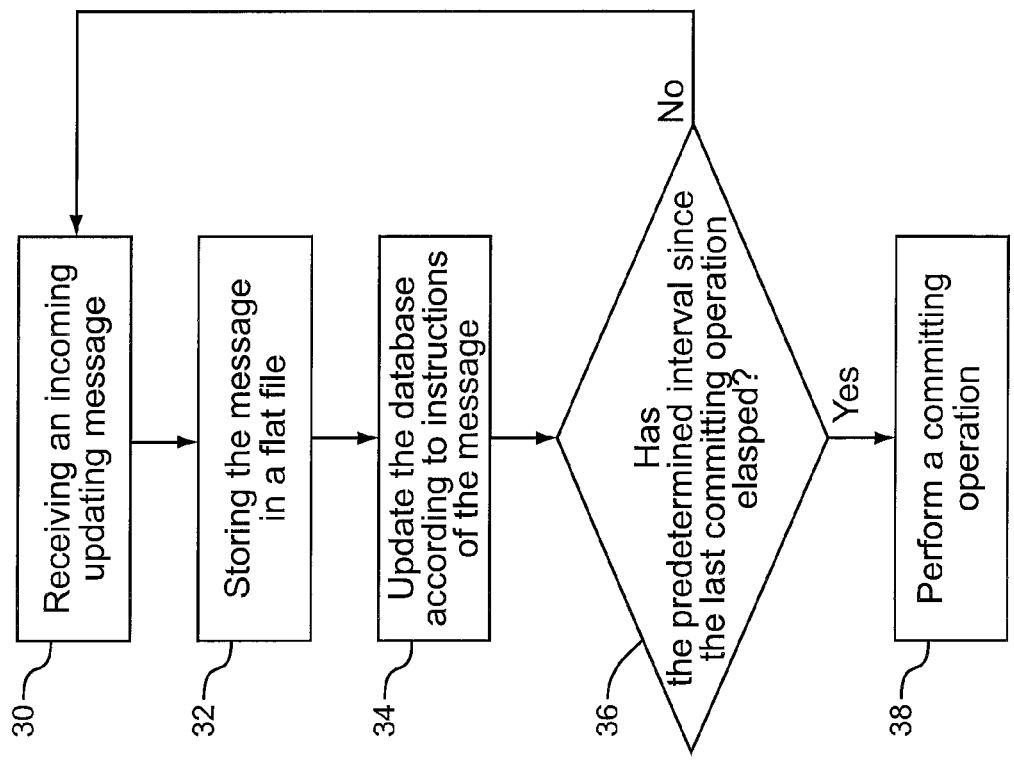
FIG. 2 shows schematically the general principles of the method according to the present invention.

Turning now to FIG. 2, the general principles of the present invention will be described. As mentioned above, even the embodiments discussed with reference to FIG. 2 and hereinafter in connection with FIGS. 3-6 are shown as being implemented within the contents of the electronic trading system shown in FIG. 1, the present invention, as the skilled man within the art easily realizes, can be implemented in practically all transaction burdened computer systems. Furthermore, the method according to the present invention is described as being implemented in the first server 16a, but, as the skilled man within the art realizes, the method can also or instead be implemented in the second server 16b.

First, at step 30, an new incoming updating message containing updating instructions for the database 18a (and the database 18b) is received, for example, from a client 12a, 12b, 12c. Then, at step 32, the received message is stored in a file having a horizontal file structure, for example, in a flat file of the memory 17a. Thereafter, at step 34, the database 18a is updated in accordance with the instructions of the message, for example, a new user is added. It should be noted that the business logic 20a has access to the new information, i.e., the updated information, even though the information has not been committed. At step 36, a check whether a predetermined interval since the last committing operation has elapsed. If no, the algorithm returns to step 30. If yes, the algorithm proceeds to step 38, where a committing operation is executed in order to make all data modifications performed since the last of the committing operation a permanent part of the database. Due to the fact that the committing operation is performed at predetermined intervals, the updating operations of a number of messages is performed each committing operation. Thereby, the process may enhance the performance of the system.

According to an embodiment, the sequence numbers of the messages received since the last committing operation is committed in the database when a committing operation of all updating operations is performed. For example, the sequence number are stored in a table of the database. Thereby, it is possible to check which updating operations that should be committed in the database at the committing operation. For example, the sequence numbers of the messages stored in the horizontal file structure can be checked and compared with the committed sequence numbers in order to identify whether a predetermined number of messages has been received since the last operation of committing was performed. As an example, the committing operation may be executed when 1000 messages has been received. That is, when the database has been updated according to the instructions of the last 1000 messages, the committing operation is performed in order to make all these data modifications performed since the last of the committing operation a permanent part of the database.

Figure 3:
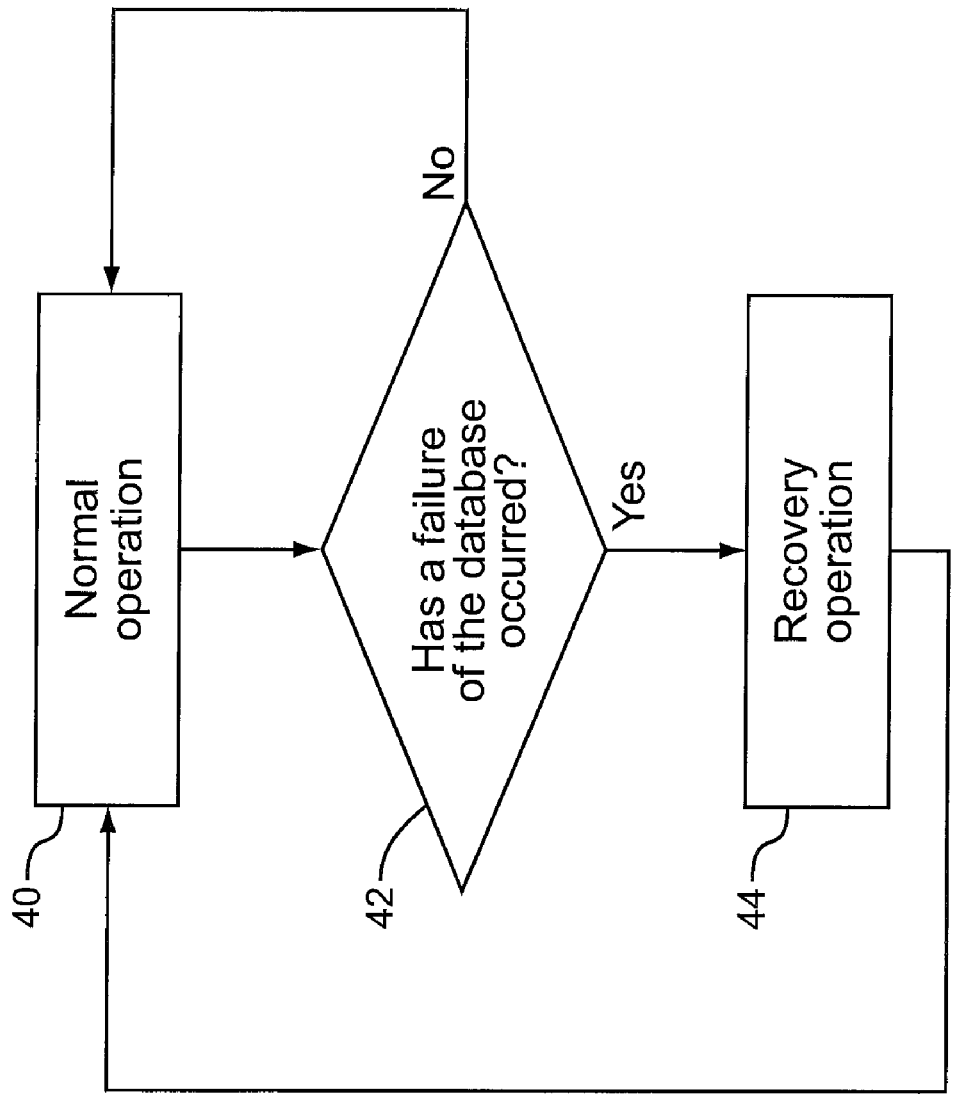
FIG. 3 is a flow chart showing steps of an embodiment of the method according to the present invention.
Figure 4:
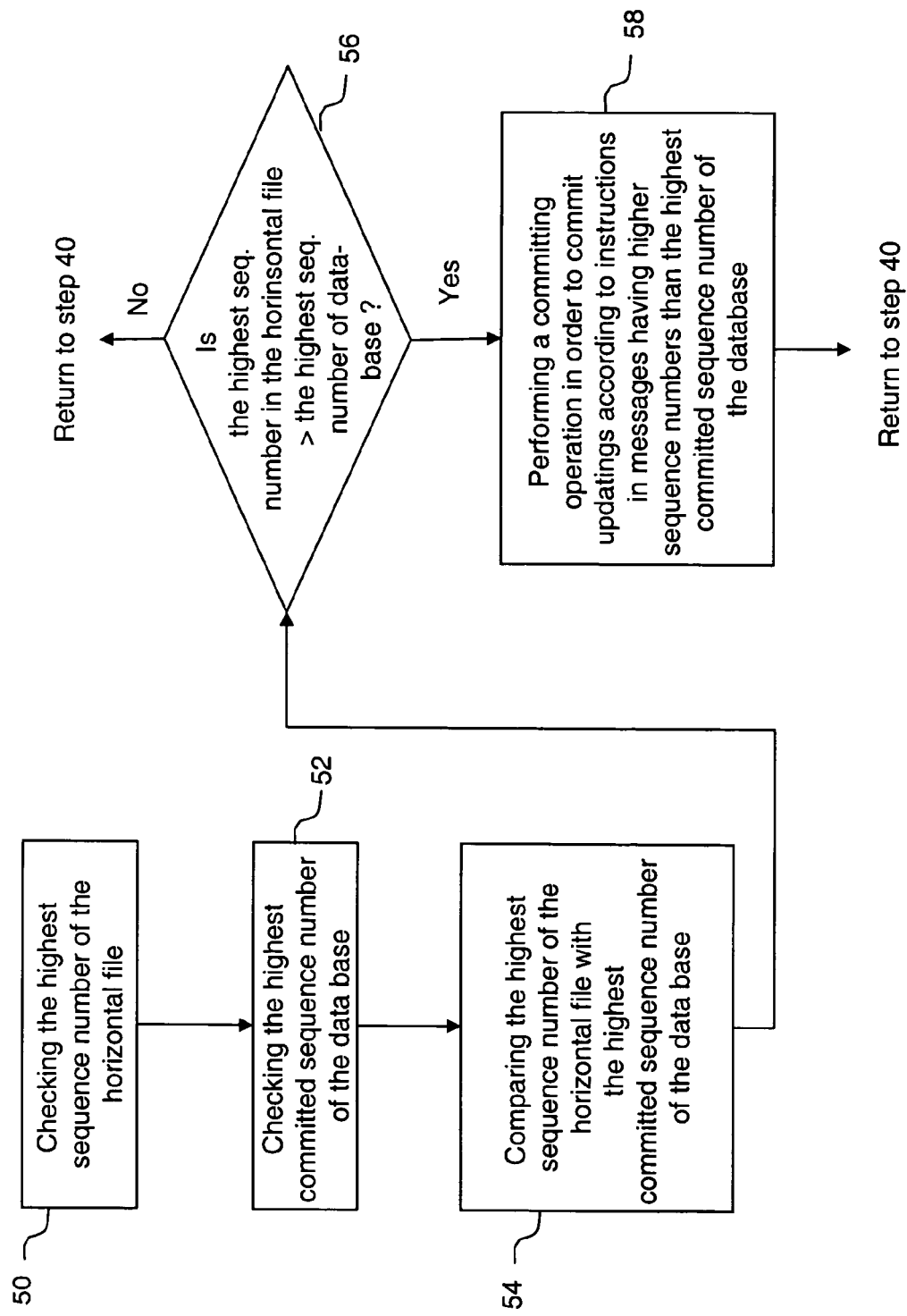
FIG. 4 is a flow chart showing steps of the embodiment of the method according to the present invention shown in FIG. 3.

Another embodiment of the present invention will now be discussed with reference to FIGS. 3 and 4. Turning to FIG. 4, at step 40, the system 10 operates according to normal procedures, i.e., according to the procedure outlined with reference to FIG. 2. Then, at step 42, a failure of the database 18a and/or the database 18b and/or the server 16a and/or the server 16b is identified. This means that all updates and/or modifications performed in the database (-s) but not committed yet will be lost. In this case the algorithm proceeds to step 44, where a recovery operation is performed in order to recover all updates and/or modifications performed in the database (-s) but not committed at the failure. With reference to FIG. 4, the recovery procedure will be described. First, at step 50, the highest sequence number of the messages stored in the flat file 17a is checked. Then, at step 52, the highest committed sequence number of the data base is checked. In step 54, these two sequence numbers are compared and then, in step 58, it is determined whether the sequence number of the flat file is higher than the sequence number of the database. If the sequence number of the database is higher, the procedure returns to step 40. On the other hand, if the sequence number of the flat file 17a is higher, the algorithm proceeds to step 58 where a committing operation is performed in order to commit updating according to instructions in messages stored in the flat file having higher sequence numbers than the highest committed sequence number of the table of the database. Thereby, all information that was lost when the database failed can be recovered.

It should be noted that even though the procedures discussed above have been described with reference to the database connected to the primary server 18a, the skilled man in the art realizes that they also can be utilized in the database 18b connected to the secondary server 16b.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. Those of ordinary skill in the art will readily appreciate that the present invention could be implemented in a wide variety of embodiments, including hardware and software implementations, or combinations thereof. This application is intended to cover any adaptations or variations of the preferred embodiments discussed herein. Consequently, the present invention is defined by the wording of the appended claims and equivalents thereof.

What is claimed is:

1. A method for a computer system configured to communicate with a plurality of clients, said system including at least a server, wherein said server is configured to receive incoming messages of said system, said server being connected to a database for storing information according to instructions of said incoming messages, said method comprising the steps of:

receiving incoming messages having database update instructions;

storing said incoming messages in a flat file in a memory;

updating said database by performing database update operations according to said update instructions of said messages stored in the flat file;

performing a database commit operation, using a computer processor, of all database update operations performed since said last database commit operation at predetermined intervals in order to make all data modifications performed since the start of the last database commit operation a permanent part of the database; and accessing the messages stored in the flat file prior to performing the database commit operation.

2. The method according to claim 1 wherein the step of performing a database commit operation comprises issuing a database commit command to commit the database updates corresponding to sequence numbers of the messages stored in the flat file.

3. The method according to claim 2 wherein the step of performing a database commit operation comprises the steps of:
   checking the sequence number of said messages stored in said flat file and;
   determining whether a predetermined number of messages has been received since a last database commit operation was performed based on the sequence number.

4. The method according to claim 2 further comprising the step of:
   registering the sequence numbers of all received messages stored in said flat file.

5. The method according to claim 4 further comprising issuing the database commit command to commit all database updates performed according to the instructions in the message accumulated in said flat file having a sequence number that is greater than the sequence number of the last registered message committed when the last database update operation was performed.

6. The method according to claim 2 further comprising the step of:
   detecting a failure of one of the server and the database; and
   performing a database recovery operation responsive to detecting the failure, the recovery operation including:
   performing database update operations to update the database according to the instructions of the accumulated messages in the flat file having a sequence number that is greater than a sequence number of the last message committed when the last database commit operation was performed; and
   issuing a database commit command to commit the database updates.

7. The method according to claim 1 wherein the step of performing a database commit operation comprises the step of:
   performing a database commit operation of all database update operations performed since said last database commit operation at predetermined time intervals.

8. The method according to claim 1 wherein said step of performing a database commit operation comprises the step of: registering a sequence number of the last message in said flat file.

9. A computer-readable medium including computer-executable instructions, which when executed by a computer processor, control a server in a computer system to receive, process, and store incoming messages from a plurality of client devices during system operation, the server being connected to a database and configured to store information in the database according to instructions included in said incoming messages, said computer-executable instructions, when executed by the computer processor, further control the server to perform the steps of:
   receiving incoming messages having database update instructions from one or more client devices communicatively connected to the server;
   storing said incoming messages in a flat file in a memory;
   updating said database by performing database update operations according to said update instructions of said messages stored in the flat file;
   performing a database commit operation of all database update operations performed since said last database commit operation at predetermined intervals in order to make all data modifications performed since the start of the last database commit operation a permanent part of the database; and
   accessing the messages stored in the flat file prior to performing the database commit operation.

10. The computer-readable medium of claim 9 wherein said computer-executable logic controls the server to issue a database commit command to commit the database updates corresponding to sequence numbers of the messages stored in the flat file.

11. The computer-readable medium according to claim 10 wherein said computer-executable logic further controls the server to perform the steps of:
   checking the sequence numbers of said messages stored in said flat file and;
   determining whether a predetermined number of messages has been received since a last database commit operation was performed based on the sequence number.

12. A computer server communicatively connected to a database and one or more client computing devices, the server comprising:
   a computer readable medium including computer executable instructions, which when executed by a computer processor, control the server to:
   receive incoming messages from one or more client computers, each incoming message comprising a database update instruction;
   store the incoming messages in a flat file in a memory;
   issue a database update command to update the database according to the received instructions;
   compare a commit interval duration to a predetermined threshold; and
   thereafter and depending on results of said comparing, selectively issue a database commit command to make all database updates performed since a last database commit operation a permanent part of the database; and
   accessing the messages stored in the flat file prior to performing the database commit operation.

13. The server of claim 12 wherein each incoming message has an associated sequence identifier, and wherein the logic further controls the server to issue the database commit command to commit the database updates corresponding to the sequence identifiers of the incoming messages.

* * * * *